US012801403B2

(12) United States Patent
Flammensboeck

(10) Patent No.: US 12,801,403 B2
(45) Date of Patent: Nov. 17, 2026

(54) METHOD FOR PERSONALIZING A CHIP MODULE

(71) Applicant: Giesecke+Devrient Mobile Security Germany GmbH, Munich (DE)

(72) Inventor: Christian Flammensboeck, Munich (DE)

(73) Assignee: Giesecke+Devrient Mobile Security Germany GmbH, Munich (DE)

( * ) Notice: Subject to any disclaimer, the term of this patent is extended or adjusted under 35 U.S.C. 154(b) by 86 days.

(21) Appl. No.: 18/931,463

(22) Filed: Oct. 30, 2024

(65) Prior Publication Data

US 2025/0181361 A1 Jun. 5, 2025

(30) Foreign Application Priority Data

Oct. 30, 2023 (DE) ......................... 102023130026.1

(51) Int. Cl.

| | |
|---|---|
| ***G06F 9/445*** | (2018.01) |
| ***G06F 9/4401*** | (2018.01) |
| ***G06F 12/14*** | (2006.01) |
| ***G06F 15/177*** | (2006.01) |
| ***G06F 21/10*** | (2013.01) |
| ***G06F 21/57*** | (2013.01) |
| ***G06F 21/62*** | (2013.01) |

(52) U.S. Cl.

CPC .......... *G06F 9/4451* (2013.01); *G06F 9/4403* (2013.01); *G06F 21/572* (2013.01); *G06F 21/6209* (2013.01); *G06F 9/4406* (2013.01); *G06F 9/44505* (2013.01); *G06F 12/1408* (2013.01); *G06F 15/177* (2013.01); *G06F 21/10* (2013.01)

(58) Field of Classification Search

CPC .... G06F 9/4406; G06F 9/44505; G06F 21/10; G06F 12/1408; G06F 15/177; G06F 9/4451; G06F 9/4403; G06F 21/572; G06F 21/6209

USPC ........................................ 713/1, 2, 100, 193

See application file for complete search history.

(56) References Cited

U.S. PATENT DOCUMENTS 6,636,961 B1 * 10/2003 Braun ..................... H04L 67/34 713/1

2005/0109828 A1 * 5/2005 Jay ........................ G06F 9/4451 235/382

(Continued)

FOREIGN PATENT DOCUMENTS

DE 10142351 A1 3/2003
DE 60015810 T2 10/2005

(Continued)

*Primary Examiner* — Ji H Bae

(74) *Attorney, Agent, or Firm* — LNK LAW, PLLC

(57) ABSTRACT

Systems and methods for personalizing a chip module includes: loading initialization data into a memory of the chip module, the initialization data including an operating system and static configuration data for the chip module; executing the initialization data by the chip module and starting the operating system; loading individual personalization information into the memory using the operating system; executing a personalization sequence by the operating system on the chip module, wherein during execution of the personalization sequence the individual personalization information previously loaded into the memory is linked to the chip module.

18 Claims, 2 Drawing Sheets

(56) References Cited

U.S. PATENT DOCUMENTS

| | | | | |
|---|---|---|---|---|
| 2009/0013165 | A1 * | 1/2009 | Chow | G06F 21/575<br>713/2 |
| 2011/0173427 | A1 * | 7/2011 | Merkin | G06F 9/4451<br>713/1 |
| 2012/0030744 | A1 * | 2/2012 | Faure | H04L 9/0838<br>726/9 |
| 2014/0141746 | A1 * | 5/2014 | Tan | H04W 12/35<br>455/411 |
| 2015/0277895 | A1 * | 10/2015 | Samuel | G06F 9/4411<br>713/1 |

FOREIGN PATENT DOCUMENTS

| | | | |
|---|---|---|---|
| DE | 69736752 | T2 | 2/2007 |
| DE | 102007053744 | A1 | 5/2009 |
| DE | 102008050578 | A1 | 4/2010 |
| DE | 102010019195 | A1 | 11/2011 |
| DE | 102015210719 | A1 | 12/2016 |
| DE | 102017005057 | A1 | 11/2018 |
| DE | 102021000603 | A1 | 8/2022 |
| DE | 102023110087 | A1 | 10/2023 |
| WO | 2021239272 | A1 | 12/2021 |

* cited by examiner

METHOD FOR PERSONALIZING A CHIP MODULE

CROSS-REFERENCE TO RELATED APPLICATION(S)

This application claims priority to German Patent Application No. 102023130026.1, filed Oct. 30, 2023, which application is incorporated by reference in its entirety.

TECHNICAL FIELD

The present disclosure relates to a method for personalizing a chip module, in particular a chip module which is used to obtain personalized or subscriber-bound access to services provided by a service provider.

BACKGROUND

Chip modules are used in many areas to grant or deny authorization for access to services. A chip module contains data that can uniquely identify a person or a device. However, a chip module also contains a processor that can perform computing steps.

A chip module can be a chip card or an integrated module, for example an integrated circuit. In the case of a chip card, the chip module is a separate physical component, but the function of the chip module can also be implemented on an electronic component integrated in a device.

A chip module implemented as a chip card has, for example, a card body and an integrated circuit with a chip embedded in the card body. In this case, the chip is inserted into a cavity or module opening in the card body.

Before chip modules can be used as unique features, they usually have to be initialized and personalized. During initialization, for example, an operating system and static configuration data are loaded onto the chip module. In this state, the chip modules of a service provider are identical. In order to be able to assign a chip module uniquely to a person, the chip module must then be personalized. To personalize the chip module, for example, a unique character string and/or a key is stored on the chip module. After personalization, the chip module can be used to grant or deny individual and person-specific access to services, possibly with certain rights or roles.

WO 2021/239 272 A1 describes a method for personalizing a chip card.

SUMMARY

It may be seen an object to increase flexibility in the personalization of chip modules without having to compromise on security.

This object is solved by a method according to claim 1. Further embodiments result from the dependent claims and from the following description.

According to one aspect, a method for personalizing a chip module is provided. The method comprises the following steps: loading initialization data into a memory of the chip module, the initialization data including an operating system and static configuration data for the chip module; executing the initialization data by the chip module and starting the operating system; loading individual personalization information into the memory of the chip module using the operating system; executing a personalization sequence by the operating system on the chip module, wherein upon execution of the personalization sequence the individual personalization information is associated with the chip module.

The chip module referenced here may be a SIM card, for example. While reference is made to a SIM card in this example, the description also applies to an integrated module in which the functions of a SIM card are implemented. A SIM card is a subscriber identity module card. The abbreviation SIM stands for "subscriber identity module". With such a card, it is possible to identify oneself for access to the services of a service provider, and the service provider can assign the use of a personalized chip module, i.e. a chip module on which the aforementioned personalization sequence has been executed, to a specific person, for example for billing purposes. SIM cards are used, for example, for access by terminal devices to communication networks, in particular wireless mobile networks, although this example should not be interpreted as limiting the use of the invention.

The individual personalization information may contain individual personalization data and/or individual personalization sequences, i.e. the personalization sequences executed by the operating system either originate from the individual personalization information or are already present on the chip module.

The fact that the individual personalization information is linked to the chip module when a personalization sequence is executed means in particular that the personalization data is transferred to the relevant data structures of the chip module in order to enable the chip module to be uniquely identified and to establish the intended functionality of the chip module.

The term "chip module" is not to be understood in a limiting manner with regard to the structural design of the chip module. The chip module may therefore be a separate physical component, such as a chip card, but the function of the chip module may also be implemented on an electronic component integrated in a device.

The initialization data is usually loaded into the memory via a communication interface of the chip module. A so-called bootloader may be used for this purpose, for example. In particular, the initialization data may be transferred to the chip module via a cable and stored in the memory. The initialization data is typically transmitted in encrypted form in the chip module's memory. The static configuration data is data that is independent of the subscriber identity and configures the chip module for access to the services of a specific service provider. The static configuration data may contain different values or parameters for different service providers. However, this configuration data is referred to as static because, for a certain service provider, it is typically the same for all subscribers.

After the initialization data has been loaded into the chip module's memory, the initialization data is executed, and the operating system and the static configuration data are set to a state in which the operating system is executed by the chip module's processor (i.e. the operating system is started) and the static configuration data is linked to the respective instance of the operating system on the chip module.

At this point, the chip module is not yet personalized, but the chip module is prepared for personalization. Personalization is essential for the unique identifiability of the chip module and is almost always necessary to establish the intended functionality of the chip module. In one embodiment, a pre-personalization sequence, e.g. for personalizing a unique ID and keys for administration using the bootloader, may be applied at the end of the initialization, even before the operating system is started. After starting the operating system and executing the pre-personalization sequence, the chip module is individualized, but does not yet have an executable, fully personalized (profile) configuration. The chip module is only fully personalized and functional when the personalization of a (profile) configuration has been completed. The procedure described then loads individual personalization sequences/individual personalization data into the chip module's memory in further steps using the operating system. However, the personalization data is not yet linked to the data structures of the chip module and/or of the operating system that are relevant for the unique identifiability and usually also for the intended functionality of the chip module. Explicit operating system commands or implicit operating system states initiate the processing of the individual personalization sequences/individual personalization data preloaded in the chip module's memory, the personalization data is transferred to the existing data structures of the chip module and/or the operating system. At the end of the final personalization sequence, the chip module is fully personalized and contains a fully functional (profile) configuration. The personalization sequence is executed on the chip module, i.e. by a processor of the chip module. This means that no external function module is required, and the personalization data stored in the chip module's memory does not have to be transferred from the chip module to the outside.

The special feature of the method described here is that the individual personalization information is loaded into the memory of the chip module using the operating system and in particular using operating system calls and a personalization sequence is executed by the operating system. The bootloader of the chip module is therefore not used to load the individual personalization information, in contrast to loading the initialization data. This means that the individual personalization information can be transferred to the memory of the chip module independently and separately from the initialization data (namely using the operating system and in particular during the runtime of the operating system, i.e. while the operating system is being executed on the chip module or a processor of the chip module) and furthermore that the personalization sequence can also be executed on the chip module at an individually determinable time and independently of the loading of the initialization data and the loading of the individual personalization information by the operating system. The scope of the data to be personalized may vary, i.e. depending on the previous history, it may be an initial complete personalization, but it may also be a supplementary personalization, constant elements may also be taken into account, so that a fully personalized, fully functional profile configuration could also be replaced.

This configuration of the method makes it possible to ensure that the steps mentioned and carried out for the personalization of the chip module (loading of the initialization data, loading of the individual personalization information, executing of the personalization sequence) can be carried out independently of each other, both in terms of time and location/space. This means that the initialization data with the operating system and the static configuration data on the one hand and the individual personalization information on the other hand can be loaded into the memory of the chip module at different times and/or by different instances. The same also applies to the execution of the personalization sequence, in which the individual personalization information is linked to the chip module, i.e. transferred to the relevant data structures of the chip module, in order to enable the chip module to be uniquely identified and/or to establish the intended functionality of the chip module. The personalization sequence is a sequence of functions of the operating system. This sequence of functions is executed during the runtime of the operating system, i.e. while the operating system is being executed on a processor of the chip module. in terms of time and/or location, the personalization sequence can be executed independently of the loading of the initialization data and/or the loading of the individual personalization information into the memory of the chip module.

The ability or possibility of loading, optionally decrypting and/or executing a chip module-personalization sequence should be controlled by the chip module operating system. In addition to explicit chip module operating system commands, implicit states in the life personalization cycle of the chip module may also be considered. For example, a personalization sequence may be executed when the operating system is restarted.

After all personalization sequences have been executed, the chip module contains a fully personalized profile configuration with the personalization data defined in the personalization sequences. The chip module is fully personalized and can be distinguished from other chip modules.

In one embodiment, the method further comprises the following step: verifying a load authorization before the individual personalization information is written to the memory of the chip module.

For this purpose, for example, a key derivation token may be introduced into the operating system of the chip module in order to secure the loading of the individual personalization information and, if necessary, a subsequent decryption process and/or processing process of the individual personalization information.

The load authorization refers in particular to the fact that the individual personalization information can only be written to the memory of the chip module if this load authorization is present. This increases the security of the process, as the individual personalization information can only be written to the memory of the chip module if the load authorization is present.

In a further embodiment, the individual personalization information for loading into the memory of the chip module is provided in an encrypted form.

All known cryptographic mechanisms and necessary infrastructures can be used for this purpose. The individual personalization information is protected from access by third parties if it is made available in encrypted form.

In a further embodiment, the individual personalization information on the chip module is decrypted by the operating system before it is stored in the memory and is subsequently stored in the memory in unencrypted form. This may reduce the computational effort required for the operating system to execute the personalization sequence.

In a further embodiment, the individual personalization information is stored in the memory in encrypted form by the operating system. In this way, the confidentiality of the individual personalization information may be guaranteed. The personalization information is then decrypted by the operating system during or immediately before the personalization sequence is executed.

In a further embodiment, the individual personalization information is provided in an unencrypted form for loading into the memory of the chip module. If the individual personalization information is loaded into the memory of the chip module in a secure environment, it is not mandatory that the individual personalization information is encrypted. In this way, the computing effort on the chip module may be reduced if the personalization information does not have to be encrypted or decrypted on the chip module. For security reasons, however, it may be necessary for the operating system to store the unencrypted personalization information in the chip module's memory in encrypted form.

In a further embodiment, the method includes the step: verifying a personalization authorization before the personalization sequence is executed by the operating system on the chip module.

A key derivation token may also be introduced into the operating system of the chip module for the personalization authorization, for example, in order to link the execution of the personalization sequence by the operating system (e.g. a processing operation and/or decryption operation) to the presence of the personalization authorization.

The personalization authorization refers in particular to the fact that the personalization sequence can only be executed by the operating system if this personalization authorization is present. This increases the security of the process by ensuring that the personalization sequence is only executed if the personalization authorization is present.

In a further embodiment, the method further comprises the following step: deleting the individual personalization information from the memory of the chip module after executing the personalization sequence.

When the personalization sequence is executed by the operating system, the chip module is fully personalized and functional and can be distinguished from other chip modules. This means that it is no longer necessary to keep the personalization sequences in the chip module's memory, and they can be deleted to free up memory space. However, it should be noted that this step of the procedure is optional, and it is also conceivable that the personalization sequences remain in the memory after the personalization sequence has been executed by the operating system. This allows the personalization sequence to be executed again later and the chip module to be personalized for the same subscriber, for example if there are changes to the operating system.

In a further embodiment, the method further comprises the following step: retaining the loaded individual personalization information in the memory of the chip module after executing the personalization sequence. In this variant, the originally loaded individual personalization information is retained in the memory of the chip module and the personalization sequence can be re-executed based on this originally loaded personalization information later if required.

BRIEF DESCRIPTION OF THE FIGURES

Some details are described in more detail below with reference to the enclosed drawings. The illustrations are schematic and not to scale. Same reference signs refer to same or similar elements. It is shown in.

DETAILED DESCRIPTION

Figure 1:
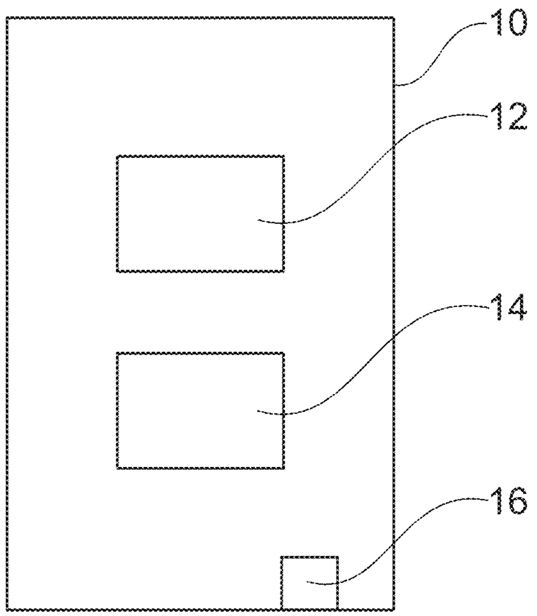
FIG. 1 depicts a schematic representation of a chip module.

FIG. 1 shows a chip module 10 as described above. The chip module 10 contains a processor 12 and a memory 14. The memory 14 is, for example, a non-volatile memory. The processor 12 is designed to execute instructions, in particular instructions that are stored in the memory 14. Furthermore, the chip module 10 comprises a communication interface 16. Data can be written to the memory 14 via the communication interface 16.

Figure 2:
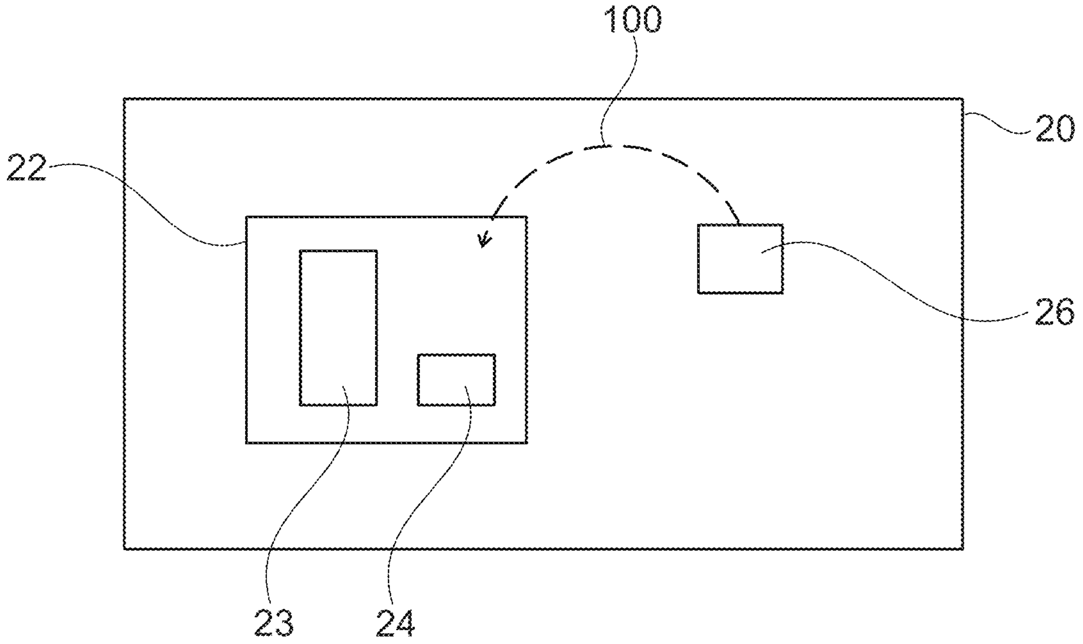
FIG. 2 depicts a schematic representation of the data for a chip module.

FIG. 2 schematically shows the structure of data 20, which is loaded into the memory 14 of the chip module 10 from FIG. 1 via the communication interface 16. The data 20 includes initialization data 22 and individual personalization information 26. The initialization data 22 in turn comprises an operating system 23, non-personalized application data and static configuration data 24. The operating system 23 is configured to load personalization information 26 into the memory 14. It is also set up to execute personalization sequences. The actions are preferably executed by means of predefined commands. The non-personalized application data may, for example, be profiles—yet to be personalized—for logging into mobile networks or payment applications.

The operating system 23 is loaded into the memory 14 and may then be executed by the processor 12. The personalization information 26 is loaded into the memory 14 by means of functions of the operating system 23 when it is executed on the processor 12 and stored there at first memory addresses. The personalization information 26 is preferably generated in a secure environment. Depending on the production environment, the transfer to the memory 14 takes place in a secure form after an optional verification of the load authorization.

The personalization information 26 contains one or more personalization sequences and individual personalization data. The personalization information 26 is conveniently provided as a so-called "BLOB" (Binary Large Object).

The chip module 10 is personalized by the operating system 23 executing the personalization sequences contained in the personalization information 26 and thereby linking the individual personalization data with the non-personalized application data and thus with the chip module 10. A personalization sequence is shown in FIG. 2 by the dashed arrow with the reference sign 100. The operating system conveniently starts the execution of the personalization with a single predefined command, for example an EXECUTE command, with or after an optional authorization verification. The personalization writes the individual personalization data from the first memory addresses, under which the personalization information 26 was stored, to target addresses defined by the non-personalized application data. The target addresses can, for example, be defined by a file system.

When executing the personalization sequence, the individual personalization data can be linked together with the static configuration data 24 in order to make the chip module 10 uniquely identifiable and distinguishable from other chip modules and/or to establish the intended functionality of the chip module.

Figure 3:
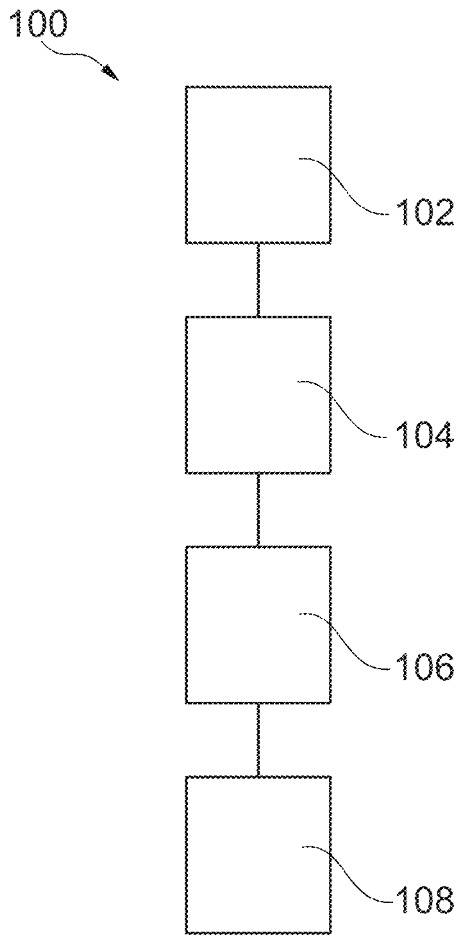
FIG. 3 depicts a schematic representation of a process for personalizing a chip module.

FIG. 3 schematically shows the steps of a method 100 for personalizing a chip module 10. In step 102, initialization data 22 is loaded into the memory 14 of the chip module 10. In step 104, the initialization data 22 is executed by the chip module 10 and the operating system 23 is started. In step 106, individual personalization information 26 containing personalization data is loaded into the memory 14 of the chip module 10 using the operating system 23. This step is performed after the operating system is started, and the operating system performs this step 106. In step 108, the personalization sequences contained in personalization information 26 are executed on the chip module 10 by the operating system 23, thereby linking the individual personalization data with the non-personalized application data and thus with the chip module 10. The reference sign 100 in FIG.

2 indicates the totality of the steps of the method 100, it being understood that the last step 108, in which the personalization sequence is executed, links the individual personalization data to the chip module 10, i.e. transfers the personalization data to the relevant data structures of the chip module, in order to enable the unique identifiability of the chip module and/or to establish the intended functionality of the chip module.

In addition, it should be noted that "comprising" or "including" does not exclude other elements or steps and "a" or "an" does not exclude a plurality. Furthermore, it should be noted that features or steps described with reference to one of the above embodiments may also be used in combination with other features or steps of other embodiments described above. Reference signs in the claims are not to be regarded as a limitation.

It is claimed:

1. A method of personalizing a chip module, the method comprising:

loading initialization data into a memory of the chip module, wherein the initialization data includes an operating system, non-personalized application data, and static configuration data for the chip module;

wherein the operating system is configured to execute a personalization sequence, executing the initialization data by the chip module and starting the operating system;

loading individual personalization information into the memory of the chip module using the previously started operating system, wherein the individual personalization information includes at least one personalization sequence and individual personalization data;

executing the at least one personalization sequence contained in the individual personalization information by the operating system on the chip module, wherein the individual personalization data are being linked to the non-personalized application data when the at least one personalization sequence is executed.

2. The method of claim 1 further comprising:

verifying a load authorization before the individual personalization information is written to the memory of the chip module.

3. The method of claim 2, wherein the individual personalization information for loading into the memory of the chip module is provided in an encrypted form.

4. The method of claim 3, wherein the individual personalization information on the chip module is decrypted by the operating system before it is stored in the memory, and subsequently stored in the memory in unencrypted form.

5. The method of claim 3, wherein the individual personalization information is stored in the memory in encrypted form by the operating system.

6. The method of claim 1, wherein the individual personalization information for loading into the memory of the chip module is provided in an unencrypted form.

7. The method of claim 6 further comprising:

verifying a personalization authorization before the at least one personalization sequence is executed by the operating system on the chip module.

8. The method of claim 7 further comprising:

deleting the individual personalization information from the memory of the chip module after executing the at least one personalization sequence.

9. The method of claim 7 further comprising:

retaining the loaded individual personalization information in the memory of the chip module after executing the at least one personalization sequence.

10. A computer program product for personalizing a chip module, comprising:

a non-transitory computer readable medium comprising instructions configured to perform a method comprising:

loading initialization data into a memory of the chip module, wherein the initialization data includes an operating system, non-personalized application data, and static configuration data for the chip module;

wherein the operating system is configured to execute a personalization sequence, executing the initialization data by the chip module and starting the operating system;

loading individual personalization information into the memory of the chip module using the previously started operating system, wherein the individual personalization information includes at least one personalization sequence and individual personalization data; and executing the at least one personalization sequence contained in the individual personalization information by the operating system on the chip module, wherein the individual personalization data are being linked to the non-personalized application data when the at least one personalization sequence is executed.

11. The computer program product of claim 10, further comprising:

verifying a load authorization before the individual personalization information is written to the memory of the chip module.

12. The computer program product of claim 11, wherein the individual personalization information for loading into the memory of the chip module is provided in an encrypted form.

13. The computer program product of claim 12, wherein the individual personalization information on the chip module is decrypted by the operating system before it is stored in the memory, and subsequently stored in the memory in unencrypted form.

14. The computer program product of claim 12, wherein the individual personalization information is stored in the memory in encrypted form by the operating system.

15. The computer program product of claim 10, wherein the individual personalization information for loading into the memory of the chip module is provided in an unencrypted form.

16. The computer program product of claim 15 further comprising:

verifying a personalization authorization before the at least one personalization sequence is executed by the operating system on the chip module.

17. The computer program product of claim 16 further comprising:

deleting the individual personalization information from the memory of the chip module after executing the at least one personalization sequence.

18. The computer program product of claim 16 further comprising:

retaining the loaded individual personalization information in the memory of the chip module after executing the at least one personalization sequence.

* * * * *